US008619931B1

(12) United States Patent
Pham et al.

(10) Patent No.: US 8,619,931 B1
(45) Date of Patent: Dec. 31, 2013

(54) MULTI-PURPOSE PHASE-LOCKED LOOP FOR LOW COST TRANSCEIVER

(75) Inventors: Tien Duc Pham, San Jose, CA (US); Sergey Shumarayev, Los Altos Hills, CA (US); Tim Tri Hoang, San Jose, CA (US); Thungoc M. Tran, San Jose, CA (US); Vinh Van Ho, San Jose, CA (US); Leon Zheng, San Francisco, CA (US)

(73) Assignee: Altera Corporation, San Jose, CA (US)

( * ) Notice: Subject to any disclaimer, the term of this patent is extended or adjusted under 35 U.S.C. 154(b) by 524 days.

(21) Appl. No.: 12/622,152

(22) Filed: Nov. 19, 2009

(51) Int. Cl.
*H04L 7/00* (2006.01)
(52) U.S. Cl.
USPC .......................................................... 375/355
(58) Field of Classification Search
USPC .......................................................... 375/355
See application file for complete search history.

(56) References Cited

U.S. PATENT DOCUMENTS

| 7,352,835 B1* | 4/2008 | Asaduzzaman et al. | 375/359 |
| 2002/0006177 A1* | 1/2002 | Pickering et al. | 375/371 |
| 2003/0016762 A1* | 1/2003 | Martin et al. | 375/308 |
| 2005/0218237 A1* | 10/2005 | Lapstun et al. | 235/494 |

OTHER PUBLICATIONS

Maangat, "Using Programmable Logic for Receiver Offset and Yield Enhancement", Altera DesignCon Feb. 4-7, 2008.*

Altera, "5. High-Speed Differential I/0 Interfaces with DPA in Stratix II and Stratix II GX Devices" Jan. 2008.*
Lamoureux et al., "FPGA Clock Network Architecture: Flexibility vs. Area and Flexibility," (2006); 8 pgs.
Chow, Daniel et al., DesignCon, A Jitter Estimation Method for Cascaded, Programmable Phase-Locked Loops; Feb. 2008, pp. 1-13, http://altera.us/literature/cp/cp-01036-jitter-estimation-method-for-cascaded-programmable-plls.pdf.
Asaduzzaman, Kazi et al., DesignCon, A Reset Control Apparatus for PLL Power-Up Sequence and Auto-Synchronization, Feb. 2008, pp. 1-10, http://www.altera.com/literature/cp/cp-01037-reset-control-apparatus-for-PLL-powerup-sequence-and-autosynchronization.pdf.
Hoang, Timet al., DesignCon, Method and Apparatus of Continuous PLL Adaptation to Variable Reference Input Frequency, Feb. 2009, pp. 1-12 http://www.altera.com/literature/cp/cp-01051-pll-adaptation.pdf.
Altera, General-Purpose PLLs in Stratix & Stratix GX Devices, Jul. 2005, pp. 1-56, http://www.altera.com/literature/hb/stx/ch_1_vol_2.pdf.
Low-voltage Differential, Nov. 19, 2009, pp. 1-1 http://en.wikipedia.org/wiki/Low-voltage_differential_signaling.
Altera, Source-Synchronous Signaling With DPA, Aug. 2005, pp. 1-16, http://www.altera.com/literature/hb/sgx/sgx_sgx51003.pdf.
Maangat, Simar et al., DesignCon, Using Programmable Logic for Receiver Offset and Yield Enhancement, Feb. 2008, pp. 1-12, http://www.altera.com/literature/cp/cp-01043-using-plds-for-receiver-offset-and-yield-enhancement.pdf.

(Continued)

*Primary Examiner* — Juan A Torres
(74) *Attorney, Agent, or Firm* — Fletcher Yoder P.C.

(57) ABSTRACT

Integrated circuits having transceivers capable of high-speed (e.g., 1 Gbps) operation without dedicated phase-locked loop circuitry are provided. One such integrated circuit device may include one or more transceivers capable of transmitting and receiving serial signals of approximately 1 Gbps or greater, and a multi-purpose phase-locked loop capable of providing a multi-phase clock signal to the one or more transceivers.

30 Claims, 5 Drawing Sheets

(56) References Cited

OTHER PUBLICATIONS

Altera, High-Speed Differential I/0 Interfaces and DPA in Arria II GX Devices, Nov. 2009, pp. 1-34, http://www.altera.com/literature/hb/arria-ii-gx/aiigx_51008.pdf.

Altera, PLLs in Arria GX Devices, May 2008, pp. 1-82, http://www.altera.com/literature/hb/agx/agx_52005.pdf.

Altera, Clock Networks and PLLs in Arria II GX Devices, Nov. 2009, pp. 1-40, http://www.altera.com/literature/hb/arria-ii-gx/aiigx_51005.pdf.

Altera, Section 1. Transceiver Architecture, Nov. 2009, pp. 1-198, http://www.altera.com/literature/hb/arria-ii-gx/aiigx_5v2_01.pdf.

Altera, High-Speed Differential I/0 Interfaces with DPA in Stratix II and Stratix II GX Devices, Jan. 2008, pp. 1-30, http://www.altera.com/literature/hb/stx2/stx2_sii52005.pdf.

Altera, Using Source-Syncronous Signaling with DPA in Stratix DX Devices, Jan. 2003, pp. 1-18, http://www.altera.com/literature/an/an236.pdf.

Lamoureux Julien et al., "FPGA Clock Network Architecture: Flexibility vs. Area and Flexibility," (2006); 8 pgs.

* cited by examiner

US 8,619,931 B1

MULTI-PURPOSE PHASE-LOCKED LOOP FOR LOW COST TRANSCEIVER

BACKGROUND

The present disclosure relates generally to integrated circuit devices having high-speed (e.g., 1 Gbps or higher) transceivers and, more particularly, to devices with high-speed transceivers without dedicated phase-locked loop circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Phase-locked loop (PLL) circuits are frequently employed by integrated circuit (IC) devices, such as a programmable logic device (PLD), to generate clock signals. In general, a PLL may be a feedback loop including a voltage-controlled oscillator (VCO) or a current-driven oscillator that outputs a clock signal. Oscillator control circuitry, which may include a phase frequency detector coupled to a charge pump, may compare the output clock signal to a reference clock signal and may drive the oscillator such that the output clock signal matches the phase and frequency of the reference clock signal. The output clock signal may enter a clock network of the IC device for distribution to data utilization circuitry, such as a field programmable gate array (FPGA) fabric.

Many IC devices employ general phase-locked loop (GPLL) circuits to generate global or regional clock signals. However, the clock signals output by such GPLL circuits may be insufficient for high-speed (e.g., greater than 1 Gbps) transceivers. Accordingly, such high-speed transceivers may typically include dedicated PLL circuits. These dedicated PLL circuits may generate clock signals sufficient to drive the high-speed transceivers, but may also take up additional die space, increasing manufacturing costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to integrated circuits (ICs) having transceivers capable of high-speed (e.g., 1 Gbps) operation without dedicated phase-locked loop circuitry. One such integrated circuit device may include one or more transceivers capable of transmitting and receiving serial signals of approximately 1 Gbps or greater, and a multi-purpose phase-locked loop capable of providing a multi-phase clock signal to the one or more transceivers

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate generally to low-cost integrated circuit (IC) devices having high-speed (e.g., 1 Gbps or greater) transceivers. Rather than employ a dedicated phase-lock loop (PLL) circuit specifically associated with one or more high-speed transceivers, present embodiments employ a multi-purpose phase-locked loop (MPLL) circuit, the clock output signals of which may drive such high-speed transceivers directly. As used herein, the term "multi-purpose phase-locked loop (MPLL)" refers to a PLL circuit that may provide clock signals to more than one component of an IC. In other words, an MPLL circuit is not a PLL circuit dedicated to only one component of an IC.

To drive a receiver (RX) of the high-speed transceiver, the MPLL circuit may generate and output a multi-phase clock signal. Using this multi-phase clock signal, the RX may generate a multi-phase current clock signal with phase-interpolation circuitry. The current clock signal may correspond to a serial signal received by the RX, and may enable the RX to recover data from the serial signal. The MPLL circuit may also supply a reference clock signal that may be used by clock-error-detecting circuitry in the transceiver, such as a parts-per-million (PPM) detector.

To drive a transmitter (TX) of the high-speed transceiver, the MPLL circuit may supply a serial clock signal and a TX serializer load signal to the TX, and a parallel data clock signal to data utilization circuitry elsewhere in the IC device. The data utilization circuitry may thereafter provide parallel data to the TX on the parallel data load signal. The TX may load the provided parallel data into a serializer, which may serialize the provided parallel data on the serial clock signal. Neither the TX nor the RX of the high-speed transceiver may include a dedicated PLL circuit.

Figure 1:
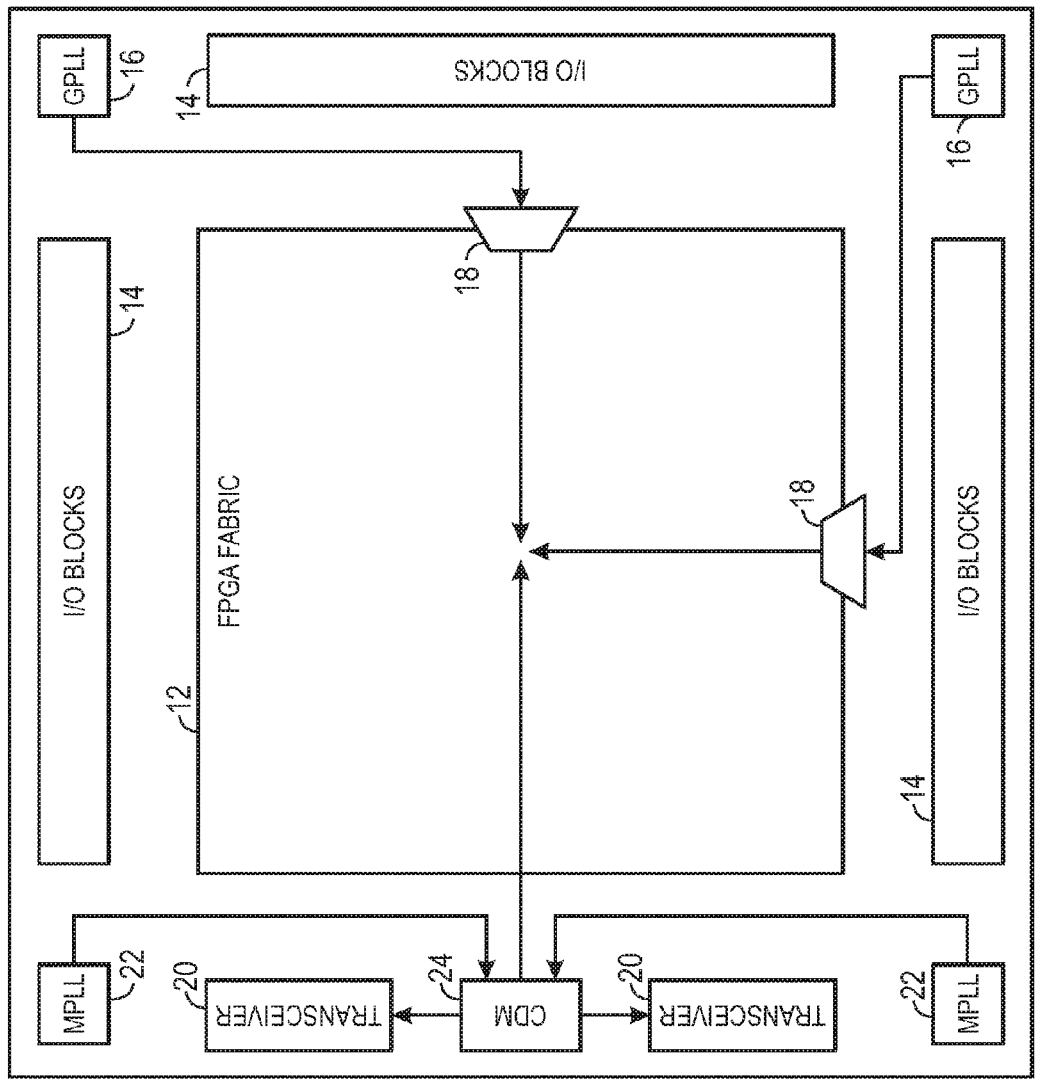
FIG. 1 is a block diagram of an integrated circuit (IC) device that includes transceivers driven by clock signals provided by multi-purpose phase-locked loop (MPLL) circuits, in accordance with an embodiment.

With the foregoing in mind, FIG. 1 illustrates a low-cost integrated circuit (IC) 10 having transceivers capable of high-speed (e.g., greater than 1 Gbps) operation, but which may not require a dedicated transceiver phase-locked loop (PLL) circuit. The IC 10 may be any suitable device and may include, for example, a programmable logic device (PLD), such as the Cyclone® family of field programmable gate array (FPGA) devices by Altera Corporation. The center of the IC 10 may include data utilization circuitry, which may be FPGA fabric 12 in certain PLDs, while the periphery may include several input/output (I/O) blocks 14 to interface with the FPGA fabric 12.

One or more general phase-locked loop (GPLL) circuits 16 on certain corners of the IC 10 may generate global and/or regional clock signals for the FPGA fabric 12. The clock signals of the GPLL circuits 16 may operate at frequencies and duty cycles suitable for the FPGA fabric 12 of the IC 10. One or more of the clock signals may be selectably provided to clock networks of the FPGA fabric 12 via, for example, multiplexers 18.

The periphery of the IC 10 may also include one or more serial transceivers 20. The transceivers 20 may receive and transmit high-speed (e.g., 1 Gbps or greater) serial signals using GigE, PCIe, or basic mode serial protocols, for example. The IC 10 may include two, four, six, eight, or more transceivers 20. Embodiments of transmitter (TX) and receiver (RX) circuitry employed by one of the transceivers 20 are described below with reference to FIGS. 3 and 4, respectively.

Rather than rely a dedicated transceiver PLL circuit, which may take up additional die space and may increase manufacturing costs, the transceivers 20 may receive clock signals from one or more multi-purpose phase-locked loop (MPLL) circuits 22. The MPLL circuits 22 may supply clock signals both to the transceivers 20 and to the FPGA fabric 12 via a clock distribution module (CDM) 24. To support the high-speed transceivers 20, the MPLL circuits 22 may supply a multi-phase clock signal to the RX of one of the transceivers 20, certain control signals to the TX of one of the transceivers 20 and to the FPGA fabric 12, and a reference clock signal to clock-error-detecting circuitry. It should be understood that in the instant example, all the transceivers 20 are located on one side of the IC 10, but that the transceivers 20 may be located anywhere sufficiently proximate to one of the MPLL circuits 22 to receive such clock signals.

Figure 2:
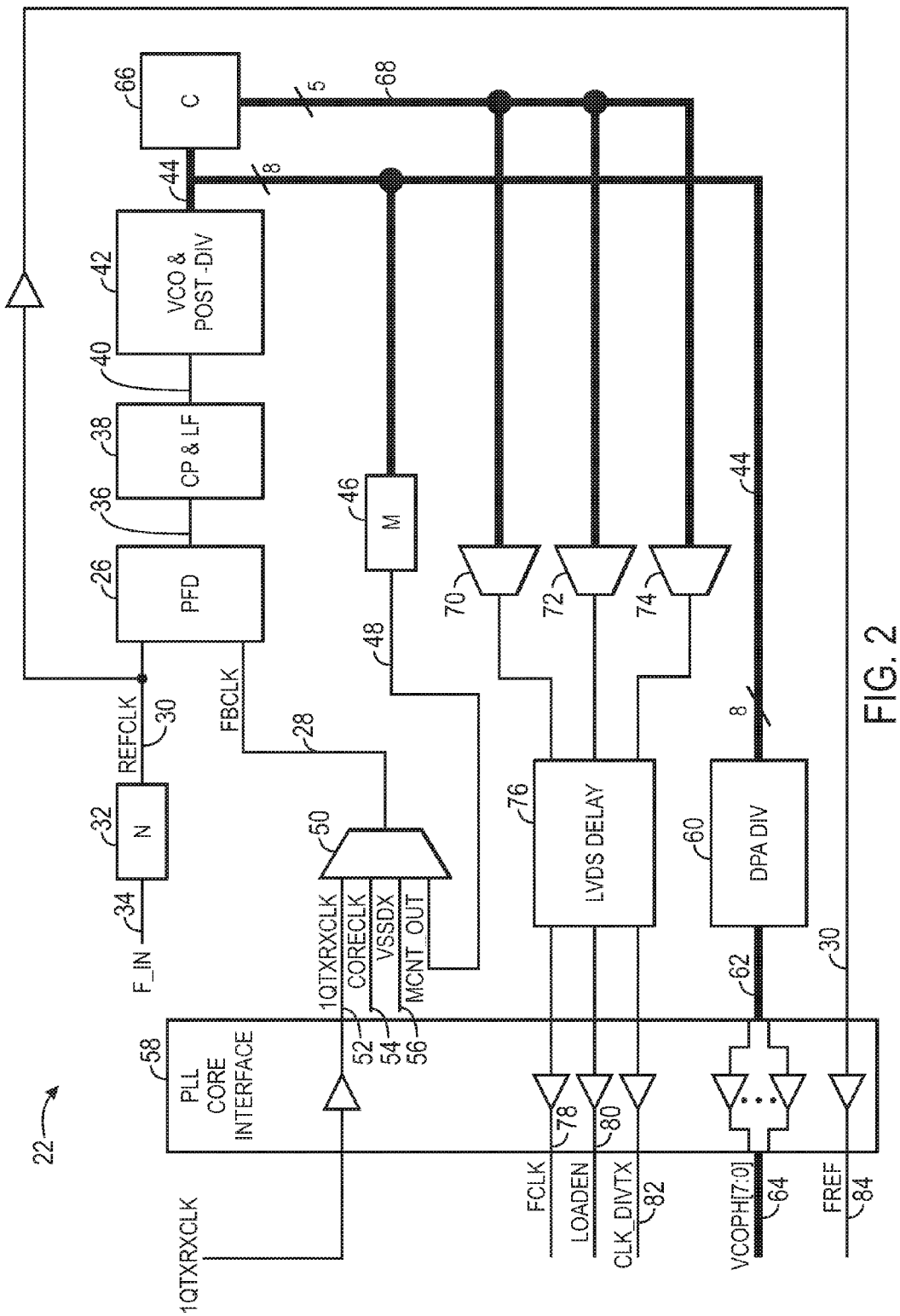
FIG. 2 is a block diagram of an MPLL circuit of the IC device of FIG. 1, in accordance with an embodiment.

FIG. 2 illustrates an embodiment of one of the multi-purpose phase-locked loop (MPLL) circuits 22 of the IC 10 depicted in FIG. 1. To produce clock signals for use by the transceivers 20 and/or the FPGA fabric 12, a phase frequency detector (PFD) 26 may compare a feedback clock signal 28 generated by the MPLL circuit 22 to a reference clock signal (REFCLK) 30 deriving from an external source. In general, the reference clock signal (REFCLK) 30 may result when a pre-scale counter (N) 32 divides the frequency of an input clock signal (FIN) 34 by a particular amount N. The input clock signal (F_IN) 34 may be, for example, a clock signal of a lower frequency generated by another PLL circuit of the IC 10.

If the feedback clock signal 28 differs from the reference clock 30 in phase or frequency, the PFD 26 may output an error signal 36 to charge pump and loop filter (CP & LF) circuitry 38. Based on the error signal 36, the CP & LF circuitry 38 may output a control voltage 40 that may cause voltage-controlled oscillator and post-division (VCO & post-div) circuitry 42 to output an eight-phase clock signal 44 of stable, increasing, or decreasing frequency. By way of example, the error signal 36 of the PFD 26 may be an "up" signal or a "down" signal that may cause the VCO & post-div circuitry 42 to respectively increase or decrease the frequency of the eight-phase clock signal 44. Each of the phases of the eight-phase clock signal 44 may be separated by 45 degrees (e.g., the phases may be at 0, 45, 90, 135, 180, 225, 270, and 315 degrees).

One phase of the eight-phase clock signal 44 may enter a feedback counter (M) 46. The feedback counter (M) 46 may multiply the frequency of the one phase of the eight-phase clock signal 44 by a particular number M to produce a feedback signal 48. The multiplied feedback signal 48 may represent one of many possible feedback clock signals 28 that may be selectable via a multiplexer 50. Other feedback clock signals 28 that may be selectable via the multiplexer 50 may include, for example, a recovered transceiver clock signal 52, a core clock signal 54 from the FPGA fabric 12, and/or a VSSDX signal 56, which may derive from a PLL interface 58 to the clock distribution module 24 and/or the FPGA fabric 12. The VSSDX signal 56 may be used to turn off the MPLL circuit 22.

When the multiplexer 50 selects the feedback signal 48 as the feedback clock signal 28, the frequency of the output eight-phase clock signal 44 from the VCO & post-div circuitry 42 may be described as equivalent to the frequency of the reference clock signal (REFCLK) 30 multiplied by M. In other words, the frequency of the eight-phase clock signal 44 may be equivalent to the frequency of the input clock signal (F_IN) 34 multiplied by M and divided by N. Thus, the eight-phase clock signal 44 may depend on the input clock signal (F_IN) 34 and the values M and N of the feedback counter (M) 46 and pre-scale counter (N) 32. In some embodiments, the values M and N may be programmable and/or reprogrammable.

Before being output to receiver (RX) circuitry in one of the transceivers 20, such as the RX circuitry described below with reference to FIG. 4, the eight-phase clock signal 44 may enter a divider circuit 60. The divider circuit 60 may further divide the eight-phase clock signal 44 to produce a divided eight-phase clock signal 62 with a frequency that matches the expected frequency of a serial signal entering the RX circuitry. The divided eight-phase clock signal 62 may be buffered through the PLL core interface 58 and output as a multi-phase clock signal 64. As described below, the eight-phase clock signal 64 may be employed by either the PFGA fabric 12 or the RX circuitry.

To enable a transmitter (TX) of the transceivers 20 of the IC 10, such as the TX described below with reference to FIG. 3, selected phases of the eight-phase clock signal 44 may enter post-scale counters (C) 66. In the embodiment illustrated in FIG. 2, five post-scale counters (C) 66 may produce five scaled clock signals 68 of varying fixed or programmable multiples (C0-C4) of the frequency of the eight-phase clock signal 44. The output scaled clock signals 68 may be equivalent to the product of the input clock signal (F_IN) 34 and the value M, further divided by the product of the values N and C. Appropriate values C0 through C4 may be programmable and/or reprogrammable to achieve the proper frequencies for the scaled clock signals 68.

In general, to drive the TX circuitry, at least one of the post scale counters (C) 66 may be programmed to produce a scaled clock signal 68 whose frequency is equal to the full TX data rate for single data rate (SDR) operation, or equal to half the TX data rate for double data rate (DDR) operation. At least one other of the post scale counters (C) 66 may produce a clock signal equal to a fraction of the frequency of the first scaled clock signal 68 appropriate to the size of parallel data to be serialized. By way of example, when ten bits of parallel data are to be serialized at a time, one of the scaled clock signals 68 may operate at a frequency of approximately 1.25 Gbps (for an SDR data rate of 1.25 Gbps or a DDR data rate of 2.5 Gbps). Another of the scaled clock signals 68 may operate at a frequency of approximately 0.25 Gbps, or one-fifth of the first frequency, or approximately 0.125, or one-tenth the first frequency.

Multiplexers 70, 72, and 74 may select an appropriate one of the scaled clock signal 68 for a low voltage differential signal (LVDS) delay block 76. The LVDS delay block 76 may introduce an appropriate amount of delay to each of the selected scaled clock signals 68 provided by the multiplexers 70-74 for the TX circuitry. For example, the LVDS delay block 76 may receive one scaled clock signal 68 operating at approximately 1.25 Gbps and two scaled clock signals 68 operating at approximately 0.25 Gbps. The LVDS delay block may output signals that, when buffered in the PLL interface 58, represent a serial clock signal (FCLK) 78 having a frequency of approximately 1.25 Gbps and a duty cycle of approximately 50 percent, a load enable signal (LOADEN) 80 having a frequency of approximately 0.25 Gbps and a duty cycle of approximately 10 percent, and a parallel data clock signal (CLKDIVTX) 82 having a frequency of approximately 0.25 Gbps and a duty cycle of 50 percent. The operation of the signals 78-82 with respect to the TX circuitry are described in greater detail below with reference to FIG. 3.

To ensure that the clock signals output by the MPLL circuit 22 remain sufficient for transceiver operation, the MPLL circuit 22 may also output a reference clock signal (FREF) 84 equivalent to the reference clock signal (REFCLK) 30. As described below, the reference clock signal (FREF) 84 may be supplied to clock error checking circuitry, such as a parts-per-million (PPM) detector. The clock error checking circuitry may monitor whether the clock signals output by the MPLL circuit 22 and provided to the transceiver circuitry 20 remain synchronized within a desired margin of error for data transmission and reception.

Figure 3:
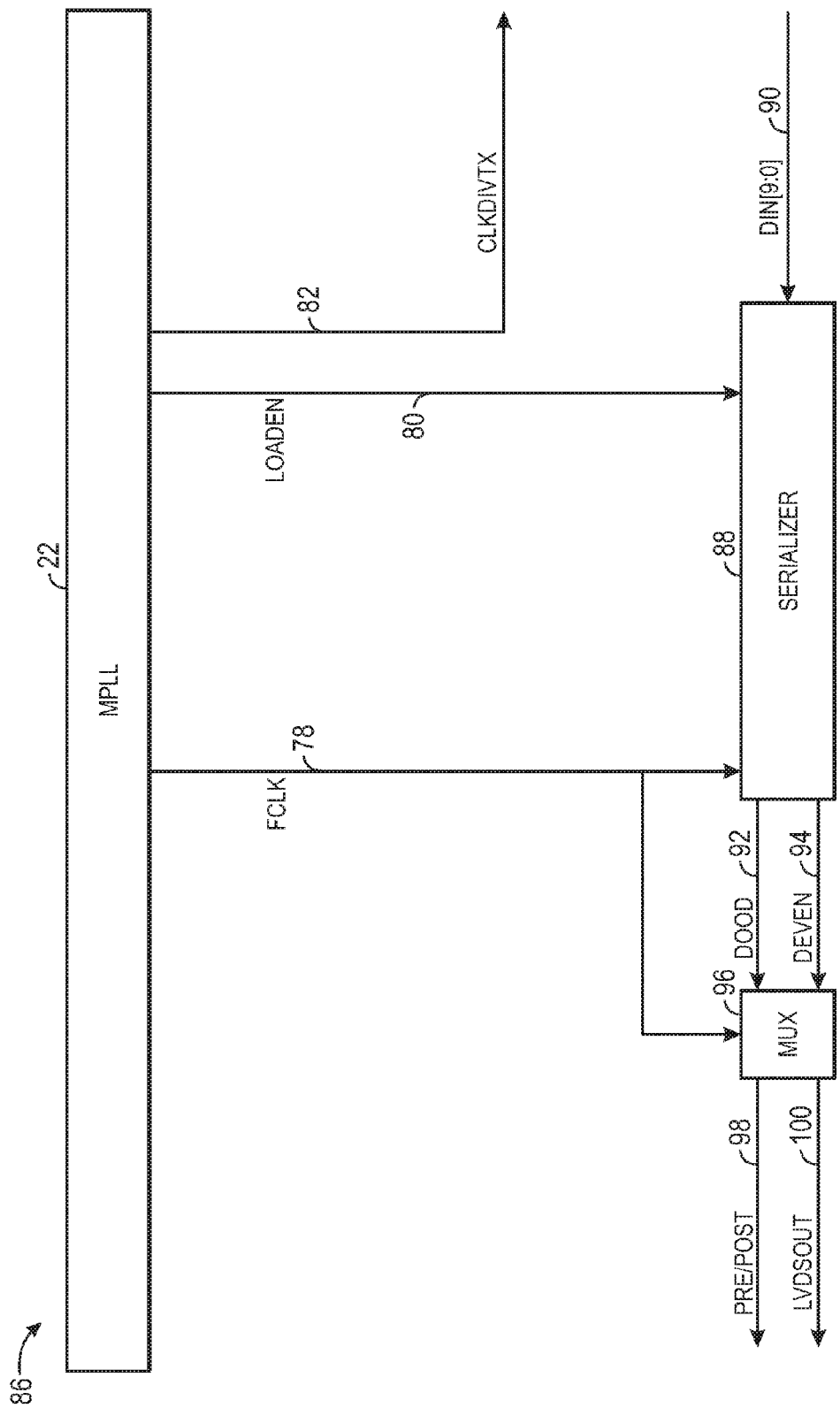
FIG. 3 is a block diagram of a transmitter (TX) of a transceiver of the IC device of FIG. 1, in accordance with an embodiment.
Figure 4:
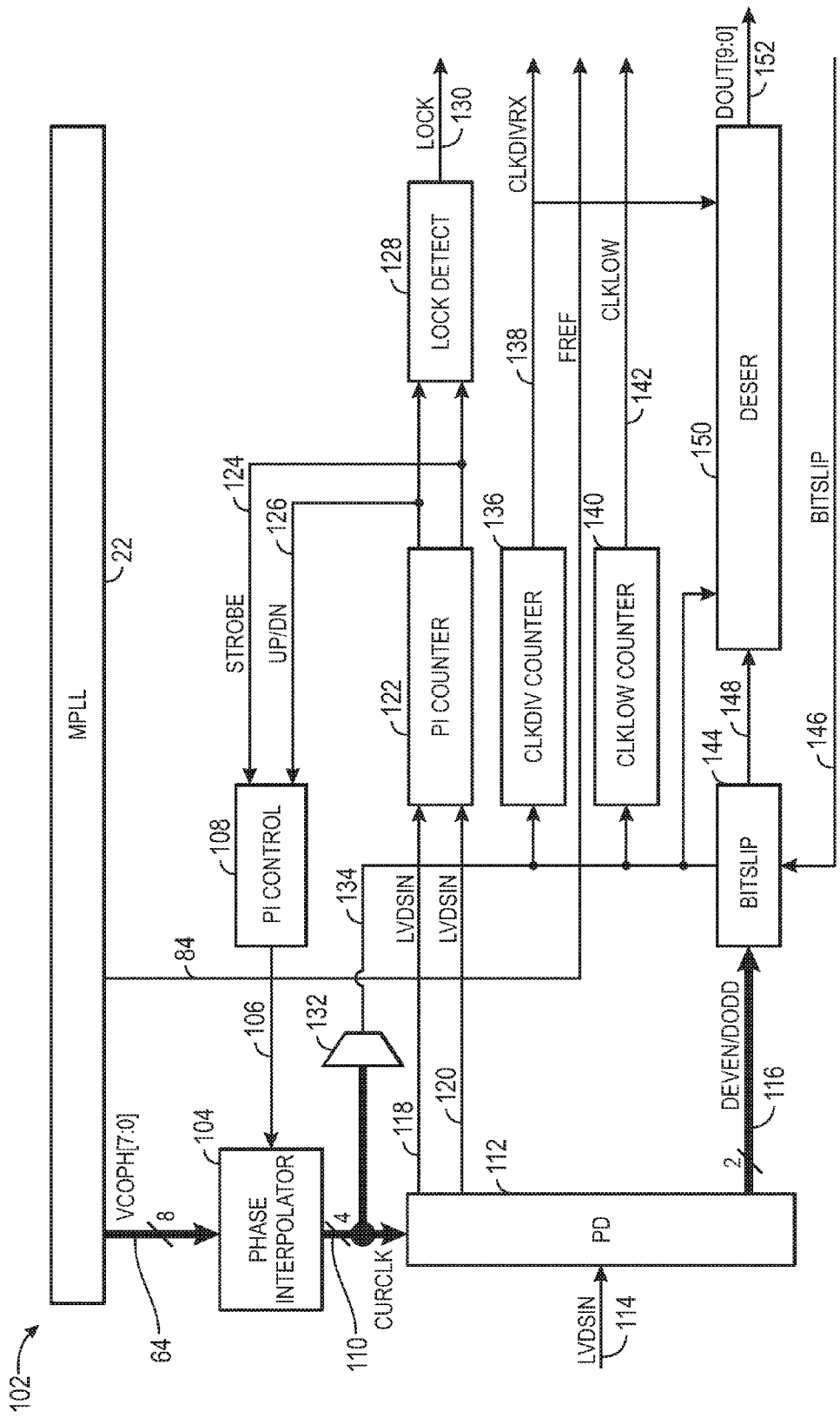
FIG. 4 is a block diagram of a receiver (RX) of a transceiver of the integrated circuit device of FIG. 1, in accordance with an embodiment.

FIGS. 3 and 4 respectively illustrate embodiments of transmitter (TX) and receiver (RX) circuitry of one of the transceivers 20. Notably, neither the TX nor the RX circuitry may employ a dedicated phase-locked loop (PLL), but rather may be driven by clock signals from the multi-purpose phase-locked loop (MPLL) 22. Turning first to FIG. 3, transmitter (TX) circuitry 86 may receive the serial clock signal (FCLK) 78, the load enable signal (LOADEN) 80, and the parallel data clock signal (CLKDIVTX) 82 directly from the MPLL circuit 22 or via the clock distribution module 24. The TX circuitry 86 may serialize data from the FPGA fabric 12 in a single data rate (SDR) mode or a double data rate (DDR) mode, the operation of which are described below. As noted above, the serial clock signal (FCLK) 78 may have a frequency equal to the full data rate for SDR mode or equal to half the data rate for DDR mode (e.g., a serial clock signal (FCLK) 78 frequency of 1.25 Gbps may enable data rates of 1.25 Gbps in SDR mode or 2.5 Gbps in DDR mode). When 10 bits of parallel data are to be serialized at a time, the load enable signal (LOADEN) 80 may have a frequency of approximately one-tenth (SDR mode) or one-fifth (DDR mode) of the serial clock signal (FCLK) 78 and a duty cycle of approximately 10 percent. The parallel data clock signal (CLKDIVTX) 82 may similarly have a frequency of approximately one-tenth (SDR mode) or one-fifth (DDR mode) of the serial clock signal (FCLK) 78, but may have a duty cycle of approximately 50 percent.

A serializer 88 may receive the serial clock signal 78 and the load enable signal 80. Concurrently, the parallel data clock signal (CLKDIVTX) 82 may be provided to other data utilization circuitry of the integrated circuit (IC) 10, such as the FPGA fabric 12 (e.g., to priority or data checking pins). A parallel data signal (DIN[9:0]) 90, illustratively depicted in FIG. 3 as including 10 bits, may be provided to the serializer 88 on a rising or falling edge of the parallel data clock signal (CLKDIVTX) 82, which may be loaded into the serializer 88 on a rising or falling edge of the load enable signal (LOADEN) 80.

When operating in a single data rate (SDR) mode, the serializer 88 may output each bit of the received parallel data signal 90 as an odd data signal (DODD) 92 and/or an even data signal (DEVEN) 94 on only a rising edge or only a falling edge of the serial clock signal (FCLK) 78. When operating in a double data rate (DDR) mode, the serializer 88 may alternatingly output each bit of the received parallel data signal 90 on either the odd data signal 92 or the even data signal 94. To operate at double the frequency of the serial clock signal (FCLK) 78, data may be latched to both the rising and falling edges of the serial signal 78. The odd data signal (DODD) 92 and even data signal (DEVEN) 94 may feed into a multiplexer 96, which may selectably output either signal 92 or 94 to a pre-emphasis/post-emphasis signal (PRE/POST) 98 and/or an output low voltage differential signal (LVDSOUT) 100 depending on the state of the serial clock signal (FCLK) 78.

Turning next to FIG. 4, a receiver (RX) 102 of the IC 10 is represented in block diagram form. To recover data received from a serial signal, the RX 102 may receive the multi-phase clock signal 64 directly from the MPLL circuit 22 or via the clock distribution module 24. A phase interpolator (PI) 104 may interpolate between the eight phases of the multi-phase clock signal 64 and/or may shift the phase forward or backward in response to a PI control signal 106 from PI control circuitry 108. The resulting current clock signal (CURCLK) 110 output by the PI 104 may include four phases at the frequency of the multi-phase clock signal 64. Each of the four phases of the current clock signal (CURCLK) 110 may be separated by 90 degrees (e.g., the phases may be at 0, 90, 180, and 270 degrees).

A bang-bang phase detector (PD) 112 may receive the four-phase current clock signal (CURCLK) 110 and a serial input signal (LVDSIN) 114. The serial input signal (LVDSIN) 114 may represent a low voltage differential signal (LVDS). When the serial input signal (LVDSIN) 114 is operating as a double data rate (DDR) signal, the serial input signal (LVDSIN) 114 may operate at the double the frequency of the four-phase current clock signal (CURCLK) 110.

Figure 5:
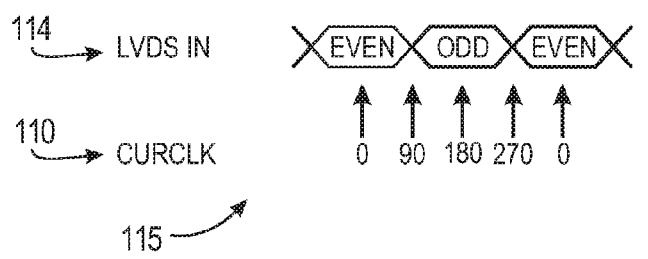
FIG. 5 is a timing diagram representing a manner of using a phase detector of the RX of FIG. 4, in accordance with an embodiment.

Turning briefly to FIG. 5, a timing diagram 115 illustrates a manner in which the PD 112 may operate. The PD 112 may sample the serial input signal 114 at rising and/or falling edges of each of the four phases (e.g., 0, 90, 180, and 270 degrees) of the four-phase current clock signal (CURCLK) 110. When the RX 102 is operating in a double data rate (DDR) mode, the PD 112 may sample the serial input signal 114 at the 0 degree and 180 degree phases of the four-phase current clock signal (CURCLK) 110 to obtain digital data signals (DEVEN/DODD) 116. When the four-phase current clock signal (CURCLK) 110 is locked to the serial input signal (LVDSIN) 114, the 0 degree and 180 degree phases should be aligned to the middle of the data of the serial input signal (LVDSIN) 114.

The PD 112 may also sample the serial input signal 114 on the phases 90 and 270 of the current clock signal (CURCLK) 110 to obtain error signals 118 (UP) and/or 120 (DN). The error signals 118 (UP) and/or 120 (DN) may indicate whether the four-phase current clock signal (CURCLK) 110 is out of alignment with the serial input signal (LVDSIN) 114. Specifically, as may be seen in the timing diagram 115 of FIG. 5, if the four-phase current clock signal (CURCLK) 110 generally is aligned to the middle of the data of the serial input signal (LVDSIN) 114, the portions of the serial input signal (LVDSIN) 114 sampled at the 90 degree and 270 degree phases sometimes may equal the DEVEN and the DODD data and sometimes may equal the DODD and the DEVEN data, respectively. That is, when the four-phase current clock signal (CURCLK) 110 is slightly behind the serial input signal (LVDSIN) 114, the portion of the serial input signal (LVDSIN) 114 sampled at the 90 degree phase may equal the DODD data, and the portion of the serial input signal (LVDSIN) 114 sampled at the 270 degree phase may equal the DEVEN data. Similarly, when the four-phase current clock signal (CURCLK) 110 is slightly ahead of the serial input signal (LVDSIN) 114, the portion of the serial input signal (LVDSIN) 114 sampled at the 90 degree phase may equal the DEVEN data, and the portion of the serial input signal (LVDSIN) 114 sampled at the 270 degree phase may equal the DODD data. The error signals 118 (UP) and/or 120 (DN) may correspond to whether the four-phase current clock signal (CURCLK) 110 is ahead of or behind the serial input signal (LVDSIN) 114.

Returning to FIG. 4, if the error signals 118 (UP) and/or 120 (DN) vary, the four-phase current clock signal (CURCLK) 110 generally may be considered to be aligned to the middle of the data of the serial input signal (LVDSIN) 114. However, if one of the error signals 118 (UP) or 120 (DN) is consistently output by the PD 112, the four-phase current clock signal (CURCLK) 110 generally may be considered to be out of alignment with the middle of the data of the serial input signal (LVDSIN) 114. Thus, a phase interpolator (PI) counter 122 may count each time one of the error signals 118 (UP) or 120 (DN) is repeatedly output by the PD 112.

Following a threshold count (e.g., 5) of one of the error signals 118 (UP) or 120 (DN), the PI counter 122 may output signals configured to cause the PI control circuitry 108 to output a control signal 106, which may cause the PI 104 to shift the phase of the four-phase current clock signal (CURCLK) 110 forward or backward by an amount. Specifically, the PI counter 122 may output a strobe signal (STROBE) 124 and a control signal (UP/DN) 126, which may in concert indicate that the phase of the four-phase clock current clock signal (CURCLK) 110 should be shifted forward or backward. A lock detection circuit 128 may receive the strobe signal (STROBE) 124 and the control signal (UP/DN) 126 to assess how frequently the four-phase current clock signal (CURCLK) 110 is being shifted. If shifting occurs sufficiently infrequently, the lock detection circuit 128 may indicate that the four-phase current clock signal (CURCLK) 110 is locked to the serial input signal (LVDSIN) 114 via a lock signal (LOCK) 130.

One phase of the four-phase clock signal 110 may be selected by a multiplexer 132 as a main current clock signal 134. The main current clock signal 134 may enter a clock divider (CLKDIV) counter 136, which may output a parallel data clock signal (CLKDIVRX) 138, which may be largely analogous to the parallel data clock signal (CLKDIVTX) 82 of the TX 86. As such, when 10 bits of serial data are to be deserialized at a time, the parallel data clock signal (CLKDIVRX) 138 may have a frequency of approximately one-tenth (SDR mode) or one-fifth (DDR mode) of the main current clock signal 134. In general, the parallel data clock signal (CLKDIVRX) 138 may have a duty cycle of approximately 50 percent.

The main current clock signal 134 may also enter a low-frequency clock divider (CLKLOW) counter 140, which may output a low-frequency current clock signal (CLKLOW) 142. The low-frequency current clock signal (CLKLOW) 142 may have the same frequency as the reference clock signal (FREF) 84. Both the low-frequency current clock signal (CLKLOW) 142 and the reference clock signal (FREF) 84 may enter clock error detection circuitry, such as a parts-per-million (PPM) detector), in the FPGA fabric 12 of the IC 10.

Before deserialization, the serial data received by the PD 112 from the serial input signal (LVDSIN) 114, digital data signals (DEVEN/DODD) 116, may enter a bitslip block 144. Clocked to the main current clock signal 134, the bitslip block 144 may bit-shift the digital data signals (DEVEN/DODD) 116 based on a bitslip signal (bitslip) 146 from the FPGA fabric 12 to output shifted digital data signals 148. The shifted digital data signals 148 may enter a deserializer 150. On the main current clock signal 134, the deserializer 150 may load a number of bits (e.g., 10) into memory in the deserializer 150. On the parallel data clock signal (CLKDIVRX) 138, the deserializer 150 may shift the loaded bits out to a parallel data signal (DOUT[9:0]) 152, which may be provided to the FPGA fabric 12 of the IC 10.

As noted above, the RX 102 may operate in a single data rate (SDR) or double data rate (DDR) mode. To operate in the SDR mode, the parallel data clock signal (CLKDIVRX) 138 may have a frequency of approximately one-tenth the main current clock signal 134. To operate in the DDR mode, the parallel data clock signal (CLKDIVRX) 138 may be output to have a frequency of approximately one-fifth the main current clock signal 134. Moreover, the main current clock signal 134, which derives from the eight-phase clock signal 64, may have a frequency equal to the full data rate for SDR mode or equal to half the data rate for DDR mode (e.g., a main current clock signal 134 frequency of 1.25 Gbps may enable data rates of 1.25 Gbps in SDR mode or 2.5 Gbps in DDR mode).

Figure 6:
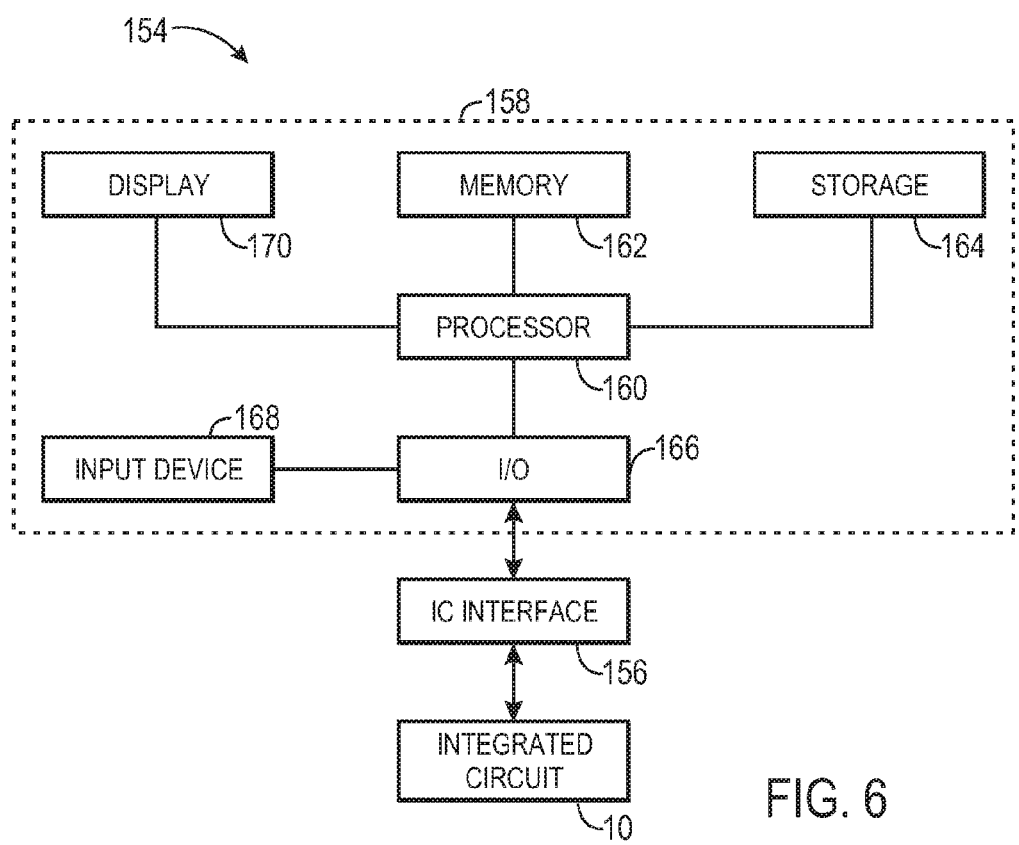
FIG. 6 is a block diagram of a system for programming the IC of FIG. 1, in accordance with an embodiment.

Many components of the IC 10, including the FPGA fabric 12, the GPLLs 16, the transceivers 20, and/or the MPLLs 22 may be user-configurable. FIG. 6 illustrates a system 154 for configuring the IC 10. As illustrated in FIG. 6, the system 154 may include the integrated circuit (IC) 10. An IC interface 156 may enable communication between the IC 10 and a data processing system 158. Such an IC interface 156 may include, for example, programmable logic device (PLD) logic within field programmable gate array (FPGA) circuitry. The IC interface 156 may operate in conjunction with FPGA software, such as QUARTUS® by Altera Corporation, which may enable programming of intellectual property (IP) into the IC 10. Additionally or alternatively, the data may be sent out via normal FPGA I/O pins of the IC 10. The receiving party may include, for example, the data processing system 158 or test equipment.

The data processing system 158 may include, among other things, a processor 160 coupled to memory 162, a storage device 164, input/output (I/O) resources 166 (which may communicably couple the processor 160 to various input devices 168), and a display 170. The memory 162 and/or storage 164 may store one or more algorithms for programming the IC 10, which may include, for example, FPGA software, such as Quartus® by Altera Corporation. Certain programmable and/or reprogrammable elements of the transceivers 20 and/or MPLL 22 may include, for example, the input clock signal (F_IN) 34, the pre-scale counter (N) 32, feedback counter (M) 46, and the post-scale counters (C) 66. With various configurations, the transceivers 20 may be made to operate with data rates of approximately 1.25 Gbps in a single data rate (SDR) mode and approximately 2.5 Gbps in a double data rate (DDR) mode.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. An integrated circuit device comprising:
one or more transceivers capable of transmitting and receiving serial signals of approximately 1 Gbps or greater; and
a multi-purpose phase-locked loop capable of providing a multi-phase clock signal to the one or more transceivers and to data utilization circuitry disposed on the integrated circuit device, wherein each of the transceivers comprises:
a phase detector configured to receive the serial signals and a current clock signal, wherein the current clock signal is based at least in part on the multi-phase clock signal, and to output one or more recovered data signals that indicate data recovered from the serial signals and one or more alignment error signals that indicate whether the current clock signal is aligned with the serial signals; and
a phase interpolator configured to receive a phase interpolator control signal and the multi-phase clock signal and to output the current clock signal, wherein the phase interpolator control signal is based at least in part on the one or more alignment error signals and wherein the current clock signal is approximately aligned with the serial input signals.

2. The device of claim 1, wherein the serial signals comprise a GigE, PCIe, or basic mode signal, or any combination thereof.

3. The device of claim 1, wherein the one or more transceivers comprise a receiver capable of recovering data from one of the serial signals latched to a rising edge or a falling edge, or both a rising edge and a falling edge, of a current clock signal of the same frequency as the multi-phase clock signal.

4. The device of claim 1, wherein one of the one or more transceivers comprises a receiver capable of interpolating a current clock signal from the multi-phase clock signal that is generally aligned with one of the serial signals.

5. The device of claim 1, wherein one of the one or more transceivers comprises a transmitter capable of serializing parallel data from elsewhere in the device on clock signals provided by the multi-purpose phase-locked loop.

6. The device of claim 1, wherein the device is a programmable logic device.

7. The device of claim 1, wherein the data utilization circuitry comprises a field programmable gate array (FPGA) fabric.

8. The device of claim 3, wherein the current clock signal comprises fewer phases than the multi-phase clock signal.

9. The device of claim 4, wherein the current clock signal comprises four phases and the multi-phase clock signal comprises eight phases.

10. A method comprising:
disposing, onto an integrated circuit device, a transceiver capable of being driven by a multi-phase clock signal;
disposing, onto the integrated circuit device, receiver circuitry configured to:
receive a serial signal and the multi-phase clock signal;
generate a current clock signal based on the multi-phase clock signal;
recover data from the serial signal by sampling the serial signal at various phases of the current clock signal; and
generate a low frequency current clock signal by multiplying one phase of the current clock signal such that the resulting low frequency clock signal has approximately the same frequency as a reference clock signal; and
disposing, onto the integrated a multi-purpose phase-locked loop circuit capable of generating the multi-phase clock signal, wherein the multi-purpose phase-locked loop circuit is configured to send the multi-phase clock signal to the transceiver and to data utilization circuitry.

11. The method of claim 10, comprising disposing, onto the integrated circuit, data utilization circuitry capable of receiving the multi-phase clock signal.

12. An integrated circuit device comprising:
a multi-purpose phase-locked loop configured to provide a multi-phase clock signal to a plurality of components of the integrated circuit, wherein the plurality of components comprises at least a transceiver configured to receive the multi-phase clock signal and data utilization circuitry configured to receive the multi-phase clock signal, wherein the transceiver comprises:
a phase detector configured to receive a serial input signal and a current clock signal, wherein the current clock signal is based at least in part on the multi-phase clock signal, and to output one or more recovered data signals that indicate data recovered from the serial input signal and one or more alignment error signals that indicate whether the current clock signal is aligned with the serial input signal; and
a phase interpolator configured to receive a phase interpolator control signal and the multi-phase clock signal and to output the current clock signal, wherein the phase interpolator control signal is based at least in part on the one or more alignment error signals and wherein the current clock signal is approximately aligned with the serial input signal.

13. The device of claim 12, wherein the serial input signal comprises a low voltage differential signal of approximately 1 Gbps or greater.

14. The device of claim 12, wherein the current clock signal comprises four phases approximately 90 degrees apart.

15. The device of claim 12, wherein the transceiver comprises current clock divider circuitry configured to divide one phase of the current clock signal to obtain a parallel data clock signal.

16. The device of claim 12, wherein the transceiver comprises a phase interpolator counter and phase interpolator control logic, wherein the phase interpolator counter is configured to monitor the one or more alignment error signals and to provide to the phase interpolator control logic one or more alignment control signals indicating when the one or more alignment error signals indicate the current clock signal is not aligned with the serial input signal, and wherein the phase interpolator control logic is configured to generate the phase interpolator control signal based on the one or more alignment control signals.

17. The device of claim 14, wherein the phase detector comprises a bang-bang phase detector configured to sample the serial input signal at each of the four phases of the current clock signal, wherein the one or more recovered data signals comprise the results of sampling the serial input signal at two of the four phases of the current clock signal and the one or more alignment error signals are based at least in part on the results of sampling the serial input signal at the other two of the four phases of the multi-phase current clock signal.

18. The device of claim 15, wherein the transceiver comprises a deserializer configured to receive the one or more recovered data signals, the one phase of the current clock signal, and the parallel data clock signal, and to output a parallel data signal on the parallel data clock signal, wherein the parallel data signal comprises deserialized data from the one or more recovered data signals.

19. The device of claim 16, wherein the phase interpolator counter is configured to output the one or more alignment control signals when the one or more alignment error signals indicate that the current clock signal is not aligned with the serial input signal in a single direction for a successive number of sampling intervals.

20. An integrated circuit device comprising:
a multi-purpose phase-locked loop configured to generate a serial clock signal, a load enable signal, and a parallel data clock signal, wherein the frequency of the serial clock signal generated by the multi-purpose phase-locked loop is a multiple of the load enable signal;
one or more transceivers configured to transmit and receive serial signals of approximately 1 Gbps or greater, wherein the one or more transceivers comprise:
a serializer configured to load parallel data on the load enable signal and serialize the parallel data on the serial clock signal; and
data utilization circuitry configured to provide the parallel data to the serializer on the parallel data clock signal.

21. The device of claim 20, wherein the multi-purpose phase-locked loop is configured to generate the serial clock signal such that the serial clock signal comprises a plurality of phases.

22. The device of claim 20, wherein the load enable signal and the parallel data clock signal generated by the multi-purpose phase-locked loop have the same frequency.

23. The device of claim 20, wherein the load enable signal and the parallel data clock signal generated by the multi-purpose phase-locked loop have different duty cycles.

24. The device of claim 20, wherein the serializer of the one or more transceivers is configured to serialize a number of bits of the loaded parallel data equal to the multiple when the one or more transceivers is are operating in a single data rate mode.

25. The device of claim 20, wherein the serializer of the one or more transceivers is configured to serialize a number of bits of the loaded parallel data equal to twice the multiple when the one or more transceivers is operating in a double data rate mode.

26. The device of claim 20, wherein the one or more transceivers are configured to operate in at least one of a single data rate mode and a double data rate mode.

27. An integrated circuit device comprising:
a multi-purpose phase-locked loop circuit configured to generate a multi-phase clock signal based at least in part on a reference clock signal;
one or more transceivers configured to receive a serial signal of approximately 1 Gbps or greater, wherein the one or more transceivers comprises:
receiver circuitry configured to receive the serial signal and the multi-phase clock signal, to generate a current clock signal based on the multi-phase clock signal, to recover data from the serial signal by sampling the serial signal at various phases of the current clock signal, and to generate a low frequency current clock signal by multiplying one phase of the current clock signal such that the resulting low frequency clock signal has approximately the same frequency as the reference clock signal;
a field programmable gate array (FPGA) fabric configured to receive the multi-phase clock signal; and
clock error detecting circuitry configured to detect errors between the low frequency current clock signal and the reference clock signal.

28. The device of claim 27, wherein the receiver circuitry of the one or more transceivers is configured to recover the data from the serial signal in a double data rate mode by sampling the serial signal at two phases of the multi-phase current clock signal separated by 180 degrees.

29. The device of claim 27, wherein the receiver circuitry of the one or more transceivers is configured to recover the data from the serial signal in a double data rate mode by sampling the serial signal at one phase of the multi-phase current clock signal.

30. The device of claim 27, wherein the clock error detecting circuitry comprises a parts-per-million detector.

* * * * *